April 17, 1962    W. J. MATTOX ETAL    3,030,431
REACTIVATION OF MOLECULAR SIEVES
Filed July 9, 1958
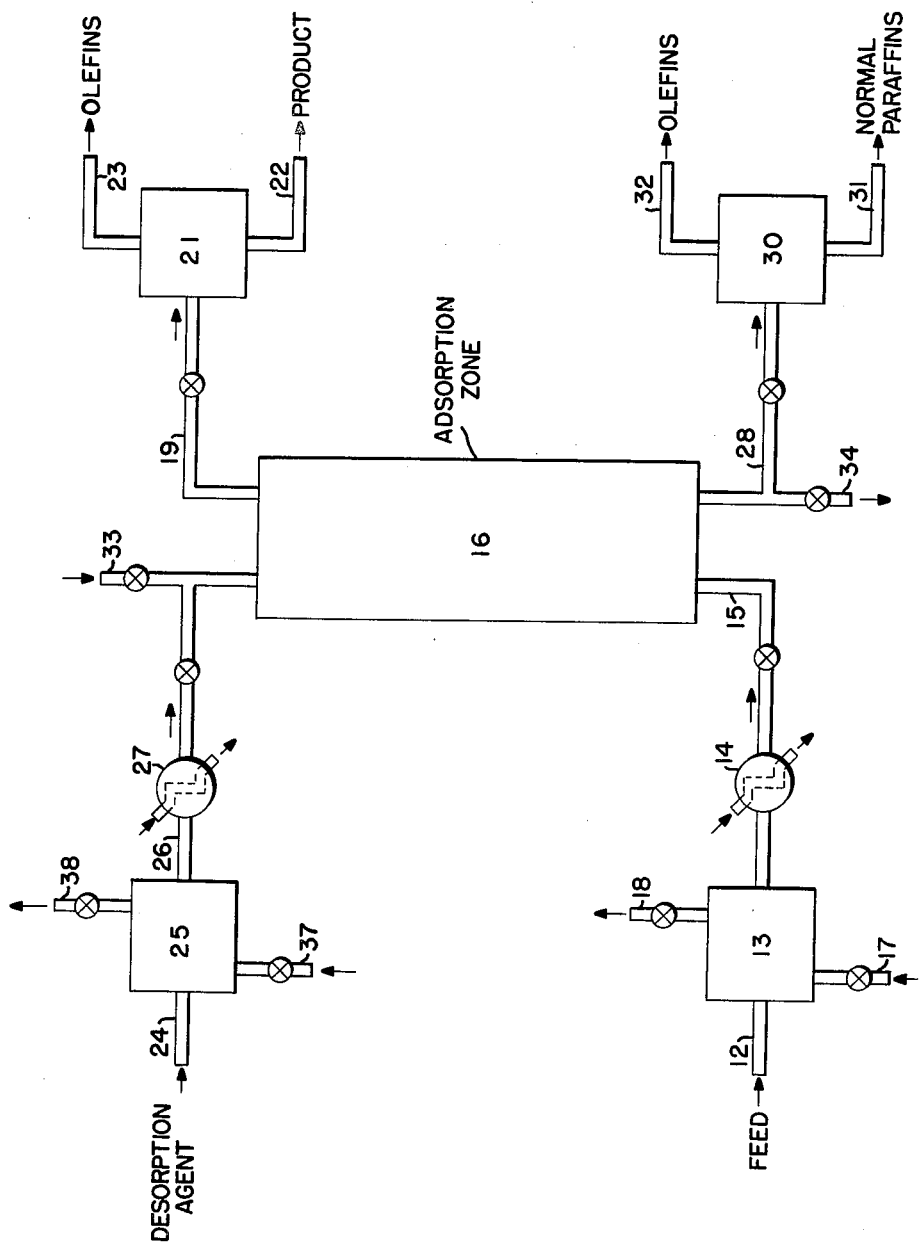
William Judson Mattox
Charles Newton Kimberlin, Jr.    Inventors
By Richard N. Nagel  Attorney

United States Patent Office 3,030,431
Patented Apr. 17, 1962

3,030,431
REACTIVATION OF MOLECULAR SIEVES
William Judson Mattox and Charles Newton Kimberlin, Jr., Baton Rouge, La., assignors to Esso Research and Engineering Company, a corporation of Delaware
Filed July 9, 1958, Ser. No. 747,532
6 Claims. (Cl. 260—676)

This invention relates to adsorption processes for the separation of hydrocarbons of selected types from mixtures with other hydrocarbons. More particularly the invention is directed to adsorption processes employing what are known as molecular sieves. The invention is especially concerned with improvements in methods for periodically restoring the adsorption capacity of molecular sieve adsorbents.

It has been known for some time that certain natural zeolites have the property of preferentially adsorbing certain types of hydrocarbons from mixtures of the same with other hydrocarbons, as for example, removing normal paraffinic hydrocarbons from mixtures of the same with isomeric branched chain hydrocarbons, cyclic hydrocarbons and so on. These zeolites are characterized by having crystal patterns such that they present structures containing a large number of pores of exceptionally uniform size. Only molecules that are small enough to enter the pores can be adsorbed by the zeolites, although not all molecules that can enter the pores will be adsorbed, because an affinity of the molecule for the adsorbent must also be present.

The pores in different zeolites may vary in diameter from less than 4 Angstroms, up to 15 or more Angstroms, but for any one zeolite the pores are of substantially uniform size. Because of these properties of uniform small pore size and of selective adsorption for certain molecules in preference to others, such zeolites are known as molecular sieves.

Among the naturally occurring zeolites that have molecular sieve properties are included analcite and chabazite. Zeolites differ from each other in chemical composition but they may be generally characterized as alkali metal or alkaline earth metal alumino-silicates. Analcite has the empirical formula $NaAlSi_2O_6 \cdot H_2O$, while that of chabazite is $CaAl_2Si_4O_{12} \cdot 6H_2O$. Certain synthetic zeolites also have molecular sieve properties. For example, the Barrer patent, U.S. 2,306,610, teaches the use of a molecular sieve having the formula $$(CaNa_2)Al_2Si_4O_{12} \cdot 2H_2O.$$

Also, Black in U.S. Patents 2,442,191 and 2,522,426 describes a synthetic molecular sieve having the formula $4CaO \cdot Al_2O_3 \cdot 4SiO_2$. An extended discussion of molecular sieves will also be found in articles by Breck and others, appearing in Journal of the American Chemical Society, vol. 78, page 5963 et seq. (December 1956).

Methods for separating the various types of hydrocarbons such as aliphatics from aromatics, straight chain from branched chain hydrocarbons and so on, have assumed increased importance in industry with the realization that specific structures contribute particular properties for the uses that are made of the particular hydrocarbons. Thus, for example, it is known in the petroleum industry that in the preparation of motor fuels the presence of normal paraffinic hydrocarbons leads to low octane ratings for the fuels, whereas branched chain hydrocarbons and aromatic hydrocarbons contribute to high octane ratings. Thus, it is important to be able to remove normal paraffins from light naphthas and thereby upgrade the octane ratings of the naphthas. The normal paraffins thus removed may be subjected to reforming or isomerization processes to convert them to other hydrocarbons of higher octane rating for blending into gasoline.

One of the particularly attractive methods for removing normal paraffinic hydrocarbons from a light naphtha is to contact the naphtha with a molecular sieve adsorbent having pore diameters of 5 A., for example. Such a sieve will adsorb straight chain paraffin hydrocarbons but not branched chain or cyclic hydrocarbons. In a commercial process it is necessary to employ a cyclic operation, that is, one involving an adsorption step followed by a desorption step and then a second adsorption step, and so on. Although excellent and selective separation of normal paraffins from a naphtha can be realized by such a procedure, one of the limiting factors is that the adsorptive capacity of the molecular sieve decreases after a number of adsorption and desorption cycles. The loss of sieve capacity is considered to involve two factors, one of them being a decrease in the saturation capacity of the sieve, and the other that the rate of adsorption decreases so that for the same feed rate the sieve is less fully saturated at the time that feed breakthrough occurs.

To some extent, the loss in capacity may be related to the method employed for desorbing the zeolite. Thus, they may be desorbed by purging with an inert gas at 600° to 700° F., under a vacuum at 600° to 700° F., by displacement of the adsorbed straight chain hydrocarbon by a gaseous olefin such as propylene at 250° to 300° F. by raising the temperature from an adsorption temperature of about 300° F. to a desorption temperature of about 700° F., or by a combination of vacuum and heat at about 700° F. In each type of desorption the sieve gradually loses capacity, though not at the same rate. This temporary loss in sieve capacity is due to the gradual accumulation of hydrocarbons or hydrocarbon derivatives, such as sulfur, nitrogen, or oxygen-containing compounds, which are not desorbable and recoverable as such. The nature of these accumulated deposits varies with the feed stock, the quantity of feed treated, operating conditions, etc. Thus, the deposits may be due to (1) polymerization or condensation of unsaturates or other reactive components on the surface of the pores, (2) to retention, in the pores, of small amounts of polar compounds present in the feed, and (3) to possible molecular rearrangements within the highly active pore surfaces to produce branched chain or cyclic compounds which are now too large to get out of the sieve pores, or (4) to various combinations of these or other related conversions.

It is the principal object of the present invention to provide a regenerating procedure wherein the adsorptive capacity of molecular sieves may be periodically restored by removing non-desorbable hydrocarbons, thereby substantially prolonging the useful life of the molecular sieves. Other and further objects and advantages of the present invention and the scope encompassed by the invention will be apparent from the ensuing description and from the claims.

In accordance with the present invention the gradual loss in adsorptive capacity that is encountered when the molecular sieve has been used over a number of adsorption and desorption cycles is avoided by operating in the following manner. The hydrocarbon mixture from which the normal paraffins are to be removed is passed through a bed of adsorbent preferably at a temperature just slightly above the dew point of the feed so that the feed is in the vapor phase, and the desorption is conducted at about the same temperature using a suitable desorption agent such as propylene. In these operations the molecular sieve gradually loses adsorptive capacity so that at the end of every 50 to 2,000 cycles the molecular sieve is regenerated by passing an oxygen-containing gas through the sieve bed at an elevated temperature so as to oxidize the non-desorbable hydrocarbons. The overall rate of loss of capacity of the molecular sieve when using this combination of olefin desorption in every cycle and periodic oxygen regeneration at the end of a given number of cycles is less than if olefin displacement alone is used or if other regenerating means, such as high temperature steam is used. The conditions under which the oxidation is carried out must be maintained within specific limits in order to avoid permanent damage to the sieve structure.

The nature and objects of the invention will be more readily understood when reference is made to the accompanying drawing, in which:

The FIGURE is a schematic flow plan of a process suitable for practicing the invention.

The process may be illustrated by describing the treatment of a light virgin naphtha having a boiling range of about 150° to 200° F. and a research octane rating of about 70 clear. A typical naphtha thus characterized may contain 20 to 25 percent of normal paraffin hydrocarbons, principally normal hexane, with a minor amount of normal heptane, the remaining material consisting principally of 6 and 7 carbon atom branched chain paraffins and cyclic hydrocarbons. Essentially only normal paraffins will be adsorbed from such a naphtha on a molecular sieve of 5 A. size.

Referring now to the FIGURE, the vaporized feed that is to be treated is heated to a temperature of 200° to 500° F. and conducted into adsorption zone 16 containing a bed of molecular sieve of 5 A. pore size. It may be preferable to pass the feed through a purifying zone to remove traces of moisture before the feed enters the adsorption tower 16, since the capacity of molecular sieves to adsorb hydrocarbons is greatly reduced if water or other polar compounds, in particular sulfur compounds, are present even in small quantities. Therefore, in the preferred mode of operation of the invention the feed is first passed by means of line 12 into a preliminary purification zone 13 containing a suitable drying agent. Removal of moisture from the feed by distillation in addition to or in place of the purification zone treatment is also contemplated. Zone 13 may contain, for example, molecular sieves of 4 A. pore size. It is also possible to employ a 5 A. or molecular sieve of larger pore opening in this zone. Alternatively, zone 13 may contain silica gel, for example, or activated alumina. The adsorptive material in the purification zone 13 may also serve to remove sulfur compounds and other materials which might be difficult to desorb from the bed of sieve in zone 16 and thus tend to build up in that bed and thereby reduce the adsorptive capacity of the bed.

The pretreated feed is then heated to adsorption temperature by passing it through heat exchanger 14 before it enters the tower or zone 16 by means of line 15. Although one purification zone 13 is shown in the drawing, it will be obvious that at least two of such zones will be necessary, the feed being switched to another of the zones when it is desired to regenerate one of the zones. Such regeneration may be accomplished by sweeping out the water with hot gases such as air, the latter entering the zone through line 17 and leaving through line 18. It is of course to be understood that a clean dry feed may not require this purification treatment.

As previously stated, the hydrocarbon feed is contacted with the molecular sieve adsorbent in zone 16 at temperatures in the range of 200° to 500° F. The molecular sieve adsorbent in the adsorption zone may be arranged in trays or packed on supports, or may be present in an unsupported condition. Typically the 5 A. sieve material may comprise pellets about $\frac{1}{16}$ to $\frac{1}{8}$ inch in diameter and $\frac{3}{16}$ to $\frac{1}{4}$ inch long and having a pore volume of about 0.25 cc. per gram. Zone 16 may be provided with means for maintaining the desired temperature, as for example enclosed steam coils or the like. Suitable treatment conditions within zone 16 include hydrocarbon flow rates of 0.25 to 2 w./w./hr., preferably about 0.5 w./w./hr., and pressures of 0 atmosphere to 75 p.s.i.g., preferably about 35 p.s.i.g.

The normal paraffin hydrocarbons contained in the feed will be adsorbed by the molecular sieve adsorbent and the effluent leaving the zone through line 19 will be essentially free of normal paraffin hydrocarbons. Thus the effluent will have higher concentrations of branched and cyclic hydrocarbons and will have a higher octane rating than the original feed. The effluent leaving through line 19 is conducted to a suitable separation zone 21 from whence it may be withdrawn through line 22 and sent to storage for subsequent use as a component of a high octane motor fuel.

The adsorption step of the cycle is continued until normal paraffin hydrocarbons begin appearing in the effluent, as determined by conventional means such as refractive index or gravity measurements or spectrographic analysis of the effluent. The naphtha feed is then switched to another tower identical with tower 16, while tower 16 is subjected to a desorption step.

The desorption step is conducted without changing the temperature of the tower 16 appreciably. Desorption is preferably accomplished by passing through the tower from line 24 an olefin-containing gas, preferably one comprising a substantial proportion of propylene. A propylene feed rate of 0.1 to 0.5 w./w./hr., preferably about 0.5 w./w./hr., is used. Butylenes may also be used. Cracked refinery gases, containing principally propylene together with minor amounts of ethane, propane and butylene, are desirable desorbing agents for this purpose. It may be desirable to first dry the olefin desorbent by passing it through a drying zone 25 similar to the drying zone 13 before the olefin is sent through heat exchanger 27 into the tower by means of line 26. Lines 37 and 38 are used for regenerating zone 25 in the same manner as lines 17 and 18 for zone 13. Olefin desorbent mixed with desorbed normal paraffins leaves the adsorption zone 16 through line 28 and is conducted to a suitable distillation zone 30 where separation of olefins from normal paraffins may be effected. The paraffinic hydrocarbons are withdrawn through line 31 and the olefins through line 32.

Although propylene and butylene are the preferred desorption agents to be employed, because of their availability and low cost, it is possible to employ other desorbents, as for example oxygenated compounds such as ethanol or normal butanol. The major criterion for a suitable desorbent is that it has essentially the same affinity for the molecular sieve as the normal paraffins being desorbed and that subsequent separation of the desorbent from the effluent or from the desorbate presents no major problems.

Surprisingly, when multiple cycles are run, data show that the lower the ratio of olefin (used in desorption) to adsorbate in the sieve, the less total olefin is required to process a given amount of naphtha feed. Thus, if 50 w./w. of feed were to be processed (20% normals), it would require 35 w./w. of propylene if a ratio of 3.5/1 were used on a cyclic basis compared to only 10 w./w. if a ratio of 1/1 were employed.

Sieve utilization is also improved at the lower olefin/adsorbate ratio. If ratios of 3.5/1 and 1/1 were used to process 50 w./w. of feed, cycle conditions would necessarily be as follows for the given feed and propylene rates.

| | 3.5/1 | 1/1 |
|---|---|---|
| Ratio $C_3^=$/Adsorbate | 3.5/1 | 1/1 |
| Feed Rate, w./w./hr | 0.5 | 0.5 |
| $C_3^=$ Rate, w./w./hr | 0.2 | 0.2 |
| Feed/Cycle, w./w.[1] | 0.198 | 0.158 |
| $C_3^=$/Cycle, w./w. | 0.138 | 0.0315 |
| Time on Feed/Cycle, Min | 24 | 19 |
| Time on $C_3^=$/Cycle, Min | 42 | 9.5 |
| Total Cycles for 50 w./w. Feed | 260 | 316 |

[1] Based on cycle capacity when 50 w./w. of feed (20% normals) has passed over the sieve. This is the way a commercial plant would probably operate.

Hence, the time required to process the 50 w./w. of feed using a ratio of only 1/1 is 150 hours compared to 286 hours when a ratio of 3.5/1 is used.

However, ratios much less than 1/1 are impractical because the resulting fast cycle times would prohibit commercial application. Best results from a commercial standpoint are therefore obtained when a ratio of about 1/1 is used.

At the end of the desorption step of the cycle the desorbed tower is again fed a stream of the hydrocarbon feed and another adsorption cycle is begun. The olefins remaining on the molecular sieve from the previous desorption step are in turn desorbed by normal paraffins from the feed and leave the tower through line 19 with the normal paraffin-free effluent and are readily separated therefrom by simple flashing or distillation in separation zone 21, being recovered from that zone through line 23 and used for a subsequent desorption step.

After a number of adsorption and desorption cycles when it is determined that the adsorptive capacity of the molecular sieves has been appreciably reduced, the molecular sieve in zone 16 is subjected to the regeneration step of the present invention. As previously stated, this step consists in removing all desorbable hydrocarbons, raising the temperature of the bed or a portion of the bed to a range of 500° to 1200° F., and passing therein an oxygen-containing gas through line 33. Temperatures as high as 1100° to 1200° F. may be used. In general, temperatures above 1000° F. should be avoided because of danger of damage to the sieve. The temperature may be suitably raised by first passing through the bed a hot purge gas such as flue gas or nitrogen by means of line 33, the gas leaving the tower through line 34. When the desired temperature has been reached, the flow of purge gas is discontinued and the regenerating gas is admitted. Alternatively, the oxygen-containing gas may be preheated up to 1000° F. In all events, temperature is carefully controlled to avoid heating the sieve above about 1000° F. for any significant period of time.

An important feature of the present invention is the removal of all desorbable hydrocarbons preceding the introduction of oxygen. This critical step is necessary to minimize the generation of high temperature steam in the sieve which results from hydrocarbon oxidation. In this respect the oxidation of the non-desorbable residual hydrocarbons from the sieve differs from the usual type of catalyst reactivation, such as cracking catalyst, where the carbonaceous deposits are almost entirely coke, the percentage of hydrogen being very low.

At the end of the cycle preceding the oxidation treat, the sieve either contains desorbing gas, such as propylene, and small amounts of normal paraffins or only normal paraffins if vacuum desorption is employed between cycles. Hence, the particular means employed for removing desorbable hydrocarbons from the sieve preceding oxidation will usually depend on the type of cyclical operating procedure being employed. Therefore, various combinations of purging, evacuation, and low temperature steaming may satisfactorily be employed. Of the preferred methods are (1) steaming at temperatures below about 600° to 700° F. and (2) purging with an inert gas, such as nitrogen, methane, etc., during the time the sieve bed is being heated to the higher level preparatory to the oxidation step. As already indicated, these gases may be preheated and used to elevate the bed temperature. Low temperature steaming is one of the preferred methods of removing olefinic desorption gases, such as propylene, since the removal of these olefins is essentially complete at temperatures below those at which polymerization occurs. This minimizes sieve deposits and thereby the amount of burning required in the subsequent oxidation, the amount of high temperature steam, etc.

The resistance of the 5 A. type sieve to degradation by high temperatures is illustrated by the following data obtained at calcination temperatures of 850° to 1500° F. in a dry atmosphere.

| Calcination Conditions | | Adsorption Capacity for n-heptane, cc./gram | |
|---|---|---|---|
| Temp., ° F. | Time, Hrs. | 500 mm. Pressure | 10 mm. Pressure |
| 850 | 0 | 0.23 | 0.16 |
| 850 | 16 | .23 | .16 |
| 950 | 168 | .23 | .16 |
| 1,000 | 16 | .23 | .16 |
| 1,200 | 1 | .21 | .16 |
| 1,300 | 1 | .21 | .15 |
| 1,300 | 5 | .21 | .15 |
| 1,350 | 1 | .22 | .16 |
| 1,400 | 1 | .21 | .14 |
| 1,400 | 4 | .18 | .13 |
| 1,500 | 4 | 0 | 0 |

The 5A sieve appears stable indefinitely at 950° F. in the absence of moisture and for a reasonable length of time at 1300° F. It is destroyed slowly at 1400° F. and quickly at 1500° F. Prolonged steaming at 950° F. and above causes losses in adsorptive capacity and adsorption rate, although the X-ray crystal pattern was not changed. Illustrative data are shown in the following tabulation for various 5A modifications.

*Steam Stability of Various 5A Modifications 950° F., 1 Atmosphere Steam*

| Metal Form of Sieve | Time, Hours | n-Heptane Adsorption | | X-ray Examination |
|---|---|---|---|---|
| | | Capacity, cc./g. | Relative Rate | |
| Calcium | 0 | 0.19 | 1 | 5A Pattern. |
| Calcium | 113 | .19 | .18 | No change. |
| Zinc | 0 | .16 | 1 | 5A Pattern. |
| Zinc | 162 | .13 | 3 | No change. |
| Cadmium | 0 | .18 | 1 | 5A Pattern. |
| Cadmium | 103 | .14 | 5 | No change. |

Steam deactivated 5A sieves can in some instances be restored to their original adsorption rates by low temperature steaming, such as that employed in the hydrocarbon desorption step described above. However, losses in adsorptive capacity are usually more permanent and are to be avoided.

Following the removal of desorbable hydrocarbons, an oxygen-containing gas is introduced into the sieve bed under conditions which cause the partial or more or less complete oxidation of the non-desorbable residual hydrocarbons or residues. Temperatures which must be held in the sieve bed to maintain combustion will vary between about 650° and 1200° F., preferably below about 1000° F. The oxygen content of the gas may be as low as 1 to 2% or less.

One preferred method for carrying out the oxidation in fixed-beds consists of burning in a wave-front procedure so that the temperature of the entire bed is not elevated. In this procedure the initial temperature of the sieve and oxygen-containing gas are such that a burning-front is established at the gas inlet to the sieve bed. Thus, the initial, inlet bed temperature should be only about 600° to 900° F. The combustion products, inert gas, steam, and any desorbed, partially oxidized hydrocarbons, are driven ahead of the burning front into portions of the sieve bed at lower temperature levels where the steam does no harm. The burning front may be initiated by (1) preheating the oxygen-containing gas, (2) use of oxidation promoters in the gas, such as oxides of nitrogen, and (3) oxidation promoters on the sieve, such as Cu, Mn, Cr, Fe, etc., introduced either by impregnation or by ion exchange with the sieve, or by other suitable means. A further advantage to this procedure will result from the use of a dry oxygen-containing gas in that the clean sieve following the burning front will be simultaneously dried in the short time held at the elevated temperature.

An excellent method of carrying out the burning is to do it in three phases, in order to control sieve bed temperatures. The first phase consists of purging the sieve with inert gas at high temperature. In the second phase, oxygen is blended with the inert purge in low concentrations, and the third phase consists of passing preheated air over the sieve bed. The following conditions may be used in burning.

| Phase | 1st | Pref. | 2nd | Pref. | 3rd | Pref. |
|---|---|---|---|---|---|---|
| Temp. of Gas, °F | 500–1,000 | 700 | 500–1,000 | 700 | 500–1,000 | 900 |
| Temp. of Sieve, °F | 500–1,000 | 700 | 500–1,000 | 700 | 500–1,000 | 900 |
| $O_2$ Conc. in Inlet Gas, percent | | | 0.2–10 | 0.75 | 21 | 21 |
| $O_2$ Rate, v./v./hr | | | 10–100 | 50 | 100–300 | 200 |
| Inert Rate, v./v./hr | 300–900 | 400 | 300–900 | 600 | | |
| Time, Hrs | 0.5–8 | 2 | 0.2–3 | 1 | 1.0–10 | 6 |

The most critical variable is the concentration of oxygen in the inlet gas during the second phase of regeneration. An $O_2$ concentration of 0.75% has been found to limit sieve bed temperature rise to about 150° F. (starting at 750° F. and peaking at 900° F.).

The following example illustrates the benefits obtained by the present invention.

EXAMPLE 1

In a vapor phase cyclic operation of the type described above, n-heptane was adsorbed from an 80% toluene-20% n-heptane mixture by an alumino-silicate of the 5A type at 240° F. and then desorbed with propylene at the same temperature. With the fresh sieve the propylene desorbed 87% of the adsorbed n-heptane. After 14 cycles, the capacity of the zeolites had decreased to about 75%. The latter was then heated in an air stream for 2 hours at 850° F. Complete reactivation was effected.

A 5 Angstrom crystalline calcium-sodium alumino-silicate discharged from a pilot plant in which normal paraffins were removed from straight run naphtha was regenerated by burning in an air stream, and the capacity for n-hexane determined. The burning step employed an air rate of 0.05 cubic feet per minute, equivalent to 0.3 gram oxygen. For comparison, results obtained by regenerating (1) with vacuum and (2) with steam at 250° F. are included. High temperature steam cannot be employed as it destroys the sieve structure.

| | Adsorptive Capacity, g./100 g. | Weight Percent Carbon | Surface Area, M.²/g. | Pore Vol., cc./g. |
|---|---|---|---|---|
| Fresh Sieve | 10.1 | 0.00 | 497 | 0.25 |
| Used, desorbed @ 700° F., 4 mm | 8.1 | 2.3 | 408 | 0.19 |
| Used, desorbed @ 850° F., 1 mm | 8.6 | 2.0 | | |
| Used, desorbed @ 1,000° F., 1 mm | 8.6 | 1.3 | 434 | 0.22 |
| Used, burned @ 850° F., in air | 10.0 | 0.2 | 471 | 0.22 |
| Used, burned @ 1,000° F., in air | 10.2 | 0.1 | 467 | 0.23 |
| Used, steamed @ 250° F | 7.3 | 1.3 | | |

These data show clearly the superiority of the regeneration technique of the present invention. Burning the carbon off in an air stream regenerated the sieve completely, while vacuum at high temperatures did not give the same extent of improvement, and steaming actually decreased the adsorptive capacity.

The process of the present invention may be modified in many details without departing from its spirit. Thus, it has also been found that, in addition to the relatively slow loss in capacity described above, there is also experienced a much more rapid loss in cycle capacity associated primarily with the use of propylene as desorbent. These losses, however, though caused by presence of deposits on the sieves, may be satisfactorily removed by vacuum regeneration at about 700° F. This type regeneration may be carried out at about every 200 cycles depending on the conditions used. The oxidative regeneration technique is satisfactorily carried out in conjunction with the vacuum regeneration. That is, those impurities that accumulate either on or in the sieves that cannot satisfactorily be removed by vacuum are then removed by periodic oxidative regeneration.

Furthermore, not only may the spent 5 Angstrom zeolites be regenerated in this manner, but the same or similar technique may also be applied to zeolites having smaller or larger uniform pores, from 3 Angstroms to 15 Angstroms. The 10 and 13 Angstrom zeolites have the capacity of separating isomeric branched and cyclic hydrocarbons, have catalytic properties, and also tend to become deactivated.

In a still further embodiment of the invention, the spent sieve may be removed from the adsorber and conveyed by a moving screen or the like over a burner zone.

Advantage may also be taken of the catalytic cracking characteristics of the sieve to regenerate it. This is particularly useful when not too much carbon as such is deposited on the zeolite. Under these conditions, a temperature of about 550° to 900° F. is imposed upon the bed of used sieves at a pressure of one atmosphere and less. A small amount of oxygen or other promoter is then added as a cracking promoter, and a small amount of steam to suppress carbon formation. Thereafter, residual carbon may be removed in the manner previously described.

This application is a continuation-in-part of Serial No. 554,565, filed December 21, 1955.

What is claimed is:

1. In a process for the removal of straight chain paraffin hydrocarbons from mixtures thereof with other hydrocarbons by contacting said mixtures with a zeolitic molecular sieve adsorbent in an adsorption zone at temperatures of 200° to 500° F. wherein said straight chain hydrocarbons are selectively adsorbed and are subsequently desorbed by displacement with a desorbing material at essentially the same temperature as employed during adsorption, the desorbing material being itself adsorbed on the molecular sieve adsorbent, and wherein said desorbing material is in turn desorbed by straight chain hydrocarbons in a subsequent adsorption step, the improvement which comprises periodically restoring the adsorptive capacity of the molecular sieve adsorbent after a selected number of adsorption-desorption cycles by subjecting the sieve adsorbent to temperatures of 500° to 1000° F. in the presence of an oxygen-containing gas.

2. Process as defined by claim 1 wherein said desorbing material comprises olefin hydrocarbons.

3. An improved process for upgrading a naphtha containing straight chain hydrocarbon in admixture with other hydrocarbons which comprises contacting said naphtha with a zeolitic molecular sieve adsorbent in an adsorption zone at temperatures in the range of 200° to 500° F., adsorbing straight chain hydrocarbons from said naphtha in said zone, withdrawing from said zone an upgraded naphtha essentially depleted of straight chain hydrocarbons, cyclically interrupting the flow of naphtha feed into said zone and desorbing straight chain hydrocarbons from said molecular sieve adsorbent by passing into said zone a gaseous olefin at temperatures in the range of 200° to 500° F. and removing therefrom a mixture of olefin and desorbed straight chain hydrocarbons, and periodically, after a number of adsorption and desorption cycles, restoring the adsorptive capacity of the molecular sieve adsorbent by heating the adsorbent zone to temperatures of from 500° to 1000° F. in the presence of an oxygen-containing gas.

4. Process as defined by claim 3 wherein said olefin comprises propylene.

5. The process of claim 3 wherein said sieve adsorbent is subjected to a three-step regenerative treatment wherein in the first stage it is purged with an inert gas at elevated temperatures, in a second stage with a gas containing 0.2 to 10% oxygen, and in a third stage with air.

6. The process of claim 5 wherein, in the second stage of said regenerative treatment, a gas containing about 0.75% oxygen is employed, and the temperature in the regeneration zone is about 700° F.

References Cited in the file of this patent

UNITED STATES PATENTS

| | | |
|---|---|---|
| 2,413,134 | Barrer | Dec. 24, 1946 |
| 2,859,170 | Dickens et al. | Nov. 4, 1958 |
| 2,899,474 | Richards | Aug. 11, 1959 |
| 2,900,430 | Henke et al. | Aug. 18, 1959 |
| 2,908,639 | Carter et al. | Oct. 13, 1959 |